Jan. 27, 1942.  B. A. YOUNG  2,271,282

PIPE FITTING

Filed May 15, 1939

Bernard A. Young
INVENTOR

BY Walter G. Miller
ATTORNEY

Patented Jan. 27, 1942

2,271,282

UNITED STATES PATENT OFFICE 2,271,282

PIPE FITTING

Bernard A. Young, Oakland, Calif.

Application May 15, 1939, Serial No. 273,689

1 Claim. (Cl. 251—167)

This invention relates to pipe fittings, and particularly to a fitting which may be placed in a piping system and is adapted to receive a so-called spectacle flange or blind, one end of which is provided with an aperture to permit fluid flow through said piping system, the other end of said flange being solid so that fluid flow is positively prevented in said system.

Heretofore, spectacle flanges or blinds have been clamped between the finished and gasketed faces of ordinary bolted companion flanges in a piping system, so that, in order to interchange ends to permit flow or to prevent flow in the system, all the bolts holding together those companion flanges had to be loosened so that the latter could be spread apart, and in addition, at least part of the bolts entirely removed. This procedure was necessarily time-consuming and awkward, and, where positive shut-off was required, as in oil piping systems for loading and unloading tank ships, and in refineries, tank farms and the like, resulted in loss of valuable time and required a number of men whose sole duties were to unbolt the companion flanges and reverse the position of the blinds between them.

This invention comprehends broadly the utilization of a threaded sleeve which is adapted to be rotatably mounted on the adjoining ends of two axially aligned pipe nipples or the like and so related to the said nipples that relative movement of the sleeve in one direction will draw together the ends of said nipples to make a fluid-tight joint with a disc or ring therebetween, and movement in the opposite direction will spread apart the said ends to release the disc, ring, or gasket to permit removal thereof. Normally, the sleeve will be provided with an opening transverse to its longitudinal axis and opposite the ends of the nipples to permit withdrawal and insertion of the desired end of the blind or spectacle flange, or the disc, ring, or gasket to be retained between the abutting ends of the pipe nipples.

One simple way of accomplishing the desired relation between the nipples and the sleeve is to provide right and left hand threads on the nipples and sleeve so that rotation of the sleeve with regard to the nipples or pipe ends will draw them together or spread them apart depending upon the direction of relative rotation. These and other desirable features of the invention will be further apparent from the following description and are shown in the attached drawing, which forms a part of this specification and illustrates a preferred embodiment, in the form of flanged nipples.

Figure 1:
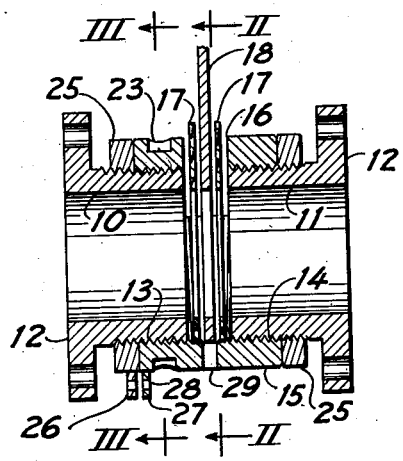
Figure 1 is a longitudinal sectional view of a pair of flanged pipe nipples connected by means of a right and left hand threaded sleeve with a spectacle flange in place to be clamped between the gasketed ends of the nipples.
Figure 2:
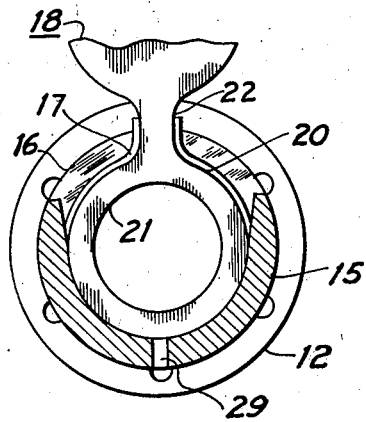
Figure 2 is a transverse sectional view on line II—II of Figure 1 and illustrates a form of opening in the sleeve for the insertion and removal of the blind or spectacle flange.

In the drawing, and particularly referring to Figure 1, reference numerals 10 and 11 designate two pipe nipples, which, in this example are provided with conventional companion flanges 12, for connection into a piping system. The inner end of nipple 10 is provided with right hand threads 13 and the inner end of nipple 11 is provided with left hand threads 14, which may be of any type, although the "Acme" form has been found desirable, particularly in the larger pipe sizes. Sleeve 14 is similarly threaded and serves to connect the two nipples 10 and 11, as shown. A transverse slot 16 in sleeve 15 (Figure 2) permits the insertion or withdrawal of gaskets 17 and spectacle flange or blind 18 between the faced ends of the nipples when they are spread apart as in Figure 1.

Figure 4:
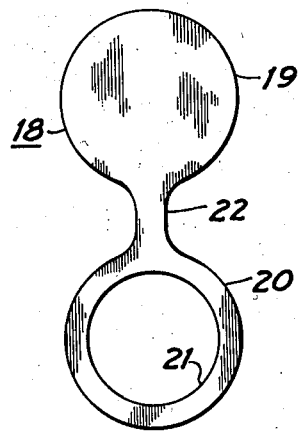
Figure 4 is a detail view of one form of a spectacle flange particularly adapted to be used with this invention.

Blind 18 is illustrated in detail in Figure 4, and, in this example, generally comprises a blank disc portion 19 of a size to correspond to the outer diameter of nipples 10 and 11 to prevent flow therebetween, a ring portion 20 with an aperture 21 to permit free communication between nipples 10 and 11, and a relatively narrow neck portion 22, which lightens the weight and also cooperates with slot 16 to permit relative motion between the sleeve 15 and blind 18, when the former is rotated to draw together or spread apart the said nipples. Obviously a separate blank disc and a ring could be used in place of the construction shown, it being generally considered more convenient to have them in one structure. Also, disc 19 could readily be provided with an accurately bored opening to serve as a restriction or orifice disc or plate for metering fluid flow in the system.

Figure 3:
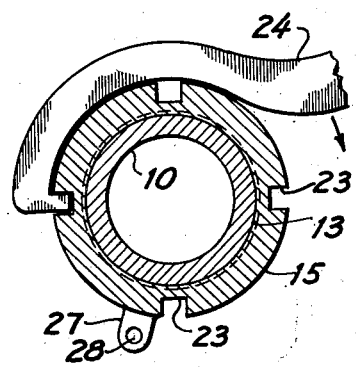
Figure 3 is a transverse sectional view on line III—III of Figure 1 and illustrates a spanner which may be used to rotate the sleeve, together with a locking lug to secure the sleeve in a desired position.

Any convenient means may be used to rotate sleeve 15 relatively to nipples 10 and 11, the latter normally being substantially held from rotation by the piping system in which they are placed, but permitted a limited longitudinal motion of a small fraction of an inch by the inherent flexibility of that system to permit insertion and removal of the blind and gaskets. In this example, a plurality of notches 23 are spaced about the periphery of sleeve 15 and are adapted to be engaged by a spanner 24, as shown in Figure 3. When the spanner is rotated in the direction indicated by the arrow, sleeve 15 will be effective to draw together nipples 10 and 11 to clamp blind 18 between gaskets 17 and thus make a fluid-tight joint. Rotation in the opposite direction obviously would spread apart the nipples to permit removal of blind 18. If disc 19 is placed between the nipples, fluid flow therethrough is positively prevented. If ring 20 is inserted, as shown in Figure 1, free communication between the nipples is maintained. The same latter result could also be obtained if blind 18 were entirely removed, in which case sleeve 15 would be rotated until the ends of the nipples seated on gaskets 17.

If desired, a properly threaded lock nut 25 may be placed at either or both ends of sleeve 15 to clamp the latter securely in pipe lines that may be subject to vibration. Spanner notches for rotating nuts 25 may be provided and, if desired, there may be provided means such as a radial lug 26, the latter to mate with a similar lug 27 on one end of sleeve 15, both lugs being drilled as at 28 to receive a padlock or other means to prevent tampering with the setting of the blind 18. If desired, drain opening 29 at the bottom of sleeve 15 will serve to release liquid which might otherwise flow upwardly out of slot 16 when the pressure is released. Provision of one or more openings to the atmosphere in sleeve 15, such as slot 16 and drain 29 gives a positive indication in case of fluid leakage past either gasket or the blind 18 and insures positively that there can be no fluid flow from one nipple to the other if such flow is not desired.

Although a specific example illustrating this invention has been shown and described, it is obvious that further modifications and changes could be made without departing therefrom, and all such that are included within the scope of the appended claim are embraced thereby.

I claim:

A flow control pipe fitting comprising a sleeve having a right hand thread on its inner surface at one end thereof and a left hand thread on its inner surface at the opposite end thereof, said sleeve being provided with a transverse slot extending through the wall thereof intermediate its ends, said slot having a length at least equal to the diameter of the sleeve bore, a pair of pipe sections one having a right hand threaded end and the other having a left hand threaded end, said pipe sections being supported in alignment in the correspondingly threaded end portions of said sleeve, the adjacent ends of said threaded pipe sections constituting clamping surfaces, said right and left hand threaded engagement of the pipe sections and the sleeve interconnecting said pipe sections and the end portions of the sleeve so that rotation of the sleeve will positively and independently advance the threaded end of each pipe section in a direction toward said transverse slot when the sleeve is rotated in one direction and in a direction away from said transverse slot when rotated in the opposite direction, and a flow controlling disc and a pair of complementary gaskets movable through said transverse slot in said sleeve into and out of assembled position between the ends of said threaded pipe sections which act to directly clamp said removable disc and gaskets in assembled position, said disc being so constructed as to engage the unslotted portion of said sleeve to facilitate location of said disc and gaskets with respect to the threaded ends of said pipe sections.

BERNARD A. YOUNG.